(12) United States Patent
Stauder et al.

(10) Patent No.: US 8,400,465 B2
(45) Date of Patent: Mar. 19, 2013

(54) METHOD OF TRANSMISSION OF A VIDEO SEQUENCE OF IMAGES THAT HAVE TO BE COLOR TRANSFORMED USING LUT

(75) Inventors: Jurgen Stauder, Montreuil sur Ille (FR); Joel Sirot, Montreuil sur Ille (FR); Laurent Blonde, Thorigne Fouillard (FR)

(73) Assignee: Thomson Licensing, Boulogne-Billancourt (FR)

( * ) Notice: Subject to any disclaimer, the term of this patent is extended or adjusted under 35 U.S.C. 154(b) by 345 days.

(21) Appl. No.: 12/452,296

(22) PCT Filed: Jun. 20, 2008

(86) PCT No.: PCT/EP2008/057903
§ 371 (c)(1),
(2), (4) Date: May 4, 2010

(87) PCT Pub. No.: WO2009/000780
PCT Pub. Date: Dec. 31, 2008

(65) Prior Publication Data
US 2010/0220111 A1    Sep. 2, 2010

(30) Foreign Application Priority Data
Jun. 27, 2007    (EP) .................................... 07301165

(51) Int. Cl.
*G09G 5/02*    (2006.01)
*G09G 5/399*    (2006.01)

(52) U.S. Cl. ........ 345/604; 345/539; 345/589; 345/600; 345/601; 345/602; 345/603

(58) Field of Classification Search .................. 345/539, 345/589, 600–604
See application file for complete search history.

(56) References Cited

U.S. PATENT DOCUMENTS

| | | | | | |
|---|---|---|---|---|---|
| 5,583,666 | A | * | 12/1996 | Ellson et al. .................. | 358/518 |
| 5,604,610 | A | * | 2/1997 | Spaulding et al. ............ | 358/525 |
| 5,642,137 | A | * | 6/1997 | Kitazumi ...................... | 345/605 |
| 5,995,653 | A | * | 11/1999 | Reed et al. .................... | 382/162 |

(Continued)

FOREIGN PATENT DOCUMENTS

| | | |
|---|---|---|
| DE | 19508545 | 3/1995 |
| EP | 1341151 | 9/2003 |

(Continued)

OTHER PUBLICATIONS

Bernd Lamparter, Wolfgang Effelsberg X-movie: Transmission and Presentation of Digital Movies under X Nov. 1991, Proc. 2nd International Workshop on Network and OS Support for Digital Audio and Video (Heidelberg, Germany), pp. 328-339.*

(Continued)

*Primary Examiner* — Xiao M. Wu
*Assistant Examiner* — Michael J Cobb
(74) *Attorney, Agent, or Firm* — Tutunjian & Bitetto, P.C.

(57) ABSTRACT

Before the transmission of the source color values of the images of each group $G_k$ of images of this sequence, a partial color transform LUT related to this group $G_k$ is generated, then transmitted, —and, a resultant color transform LUT related to said group $G_k$ is reconstructed by combining the transmitted partial color transform look up table of this group $G_k$ with, if any, all the other partial color transform look up tables that have been previously transmitted, —then each images of said group are color transformed using this LUT. The invention allows a good precision of color transformation with a limited bandwidth.

8 Claims, 1 Drawing Sheet

U.S. PATENT DOCUMENTS

| | | | |
|---|---|---|---|
| 6,434,145 B1* | 8/2002 | Opsasnick et al. | 370/394 |
| 7,012,714 B2* | 3/2006 | Higashikata et al. | 358/1.9 |
| 7,091,985 B1 | 8/2006 | Towns et al. | |
| 2003/0043173 A1* | 3/2003 | Wasserman et al. | 345/672 |
| 2003/0048943 A1 | 3/2003 | Ishikawa | |
| 2003/0146925 A1* | 8/2003 | Zhao et al. | 345/700 |
| 2005/0169544 A1* | 8/2005 | Clark | 382/236 |

FOREIGN PATENT DOCUMENTS

| | | |
|---|---|---|
| JP | 11-41625 | 12/1999 |
| JP | 2001203903 A * | 7/2001 |

OTHER PUBLICATIONS

Bernd Lamparter Wolfgang Effelsberg, NormanMichl MTP: A Movie Transmission Protocol for Multimedia Applications Apr. 1992, Multimedia '92, 4th IEEE ComSoc International Workshop on Multimedia Communications (Monterey, California), pp. 260-270.*

Ralf Keller, Wolfgang Effelsberg, Bernd Lamparter XMovie: Architecture and Implementation of a Distributed Movie System Oct. 1995, ACM Transactions on Information Systems, vol. 13(4), pp. 471-499.*

Search Report Dated Sep. 30, 2008.

* cited by examiner

METHOD OF TRANSMISSION OF A VIDEO SEQUENCE OF IMAGES THAT HAVE TO BE COLOR TRANSFORMED USING LUT

This application claims the benefit, under 35 U.S.C. §365 of International Application PCT/EP2008/057903, filed Jun. 20, 2008, which was published in accordance with PCT Article 21(2) on Dec. 31, 2008 in English and which claims the benefit of European patent application No. 07301165.2, filed Jun. 27, 2007.

BACKGROUND

1. Field of the Invention

The invention relates to a method of transmission of at least one video sequence of images that is divided into a plurality of groups of successive images, comprising, for each group of successive images, the following steps:

transmitting source color values that represent image(s) of said group in a source color space from an emitter towards a receiver, then transforming transmitted source color values into destination color values that represent image(s) of said group into a destination color space, by using a so-called resultant color transform look up table that is related to said group.

The transmission of the color transform look up table that is necessary to transform source color values into destination color values is a main issue that is addressed by the invention.

2. Discussion of Related Art

The invention relates generally to color management and in particular to color transform of color values of images that are transmitted through a video channel (as HDMI compliant wire link), when such images are grouped into at least one video sequence. When the images move along the post-production workflow from a so-called source color device to another so-called destination color device, it is necessary to transform the colors of a specific image of a video sequence from the color space associated with the source color device to the color space associated with the destination color device. Color device can be a display device as a copying device. Color device can be virtual, and then be associated for example with the well-known sRGB color space. The above-mentioned transformation of color values is usually non-linear. In practice, this transformation is done using pre-defined coloured tables, so-called Look-Up-Tables (LUTs). A LUT contains for each entry color $C_{IN}$ an output color $C_{OUT}$. Being a table, a LUT is inherently discrete in color space. Often the LUT entries are quantized coarser than the color values in order to limit its size. LUTs are often applied to different color values of images by using dedicated hardware based on specifically designed memory structures. Such hardware loads a LUT during initialization and then starts to apply the LUT to the color values of images. But, the LUT may change in time, from one sequence to a following one, for example to adapt to the temporal changing image content or to adapt to the temporal changing viewing conditions such as ambient light. In this case, for a new sequence of images, a new LUT has to be loaded into the specific hardware. The color display may be at a distant place and images of a sequence are transmitted one after the other. If the LUT needs to be updated from a specific sequence on, images of this sequence have to be transmitted such that the whole LUT is received in time for the starting of the mentioned sequence. Since transmission bandwidth of the video channel is usually limited, at least one of the following parameters is limited: the frequency of LUT update, the number of LUT entries, and the precision of LUT output values. It has to be pointed out that limited memory on receiver side has a similar effect as that of limited bandwidth.

In the document U.S. Pat. No. 5,923,316, a color transformation is disclosed, that uses a look-up-table the size of which may dynamically vary to accommodate varying parameters, such as available memory. Reducing the size of the lookup table will increase the error component in the color transformation, which reduces picture quality. However a full speed video playback can be achieved by truncating least significant bits of the LUT, until the truncated lookup table fits the memory space. A drawback of such a transmission is that the LUT are finally not entirely but only partially transmitted, because of the truncation. In the document U.S. Pat. No. 5,736,989, a method is disclosed for reducing computation time and memory space required to generate and store color conversion interpolation tables (=LUT). A partially filled, regular LUT that is filled on an "as needed" basis is disclosed. Fill status is represented by status bits. The problem of the transmission of entire large LUTs is not solved, since required LUT entries need to be calculated before an incoming color value can be transformed.

The document U.S. Pat. No. 6,771,275 discloses using a look-up table that includes both sampled data entries and difference values (also known as "differentials"). The difference values correspond to the rates of change from each table entry and its neighbors in the table. Then, the whole LUT is approximated using a sub-LUT-0, a sub-LUT-delta and an interpolation engine. Although this method resolves the problem of how to get a large sized LUT by transmitting an approximated LUT and by using an interpolation engine, a drawback of this method is that the whole LUT is only an approximation.

The document U.S. Pat. No. 6,621,498 discloses the tiling of a LUT that is used for color transform. As color values ("RGB parameters") are typically represented by three 8-bit values (for each of the R, G, and B components), the size of look up tables are prohibitively expensive and physically impractical. Therefore, such look up tables are typically partitioned into different "tile", each tile being for instance represented by three 4-bit values. Output values that are not directly represented by nodes of these tiles are determined by a form of interpolation among nodes of the look up table (LUT). Tiling look up tables can be even and regular, i.e. each tile is a cube, and the dimensions of each cube are the same. To resolve the problem of how to store (or to transmit) a large sized LUT, it is proposed to tile non-regularly look up tables. This document propose to tile a LUT based on multi-dimensional, non separable, non-regular sampling of the basic LUT into sub-LUTs, in order to increase precision where required and low memory footprint at same time. Local sampling granularity is restricted to be one of a number of discrete granularity grains in between a minimal and a maximal grain. Hereby a sliced or tiled LUT organization results. This method is complicated to implement. Moreover, the division of the basic LUT is made according to the degree of complexity of the relationship between zones of the source color space and zones of the destination color space, whatever the actual needs of transformation, i.e. the color content of the images to transform. According to the document U.S. Pat. No. 5,652,831, "An input image data is divided into upper bits and lower bits . . . . The upper bits are used by a three-dimensional color correction look-up table for outputting correct color reference points. The lower bits are used by a three-dimensional interpolation coefficient generating table for outputting the coefficients corresponding to each reference point. The color correction values of inputted image data can be conclusively computed in accordance with the two sets of data (i.e. two LUTs), i.e. the upper bits and the lower bits . . . . Then, the appearance equivalent color characteristics are analyzed according to the inputted image data to determine the dividing ratio of the upper bits and the lower bits (i.e. the division between the two LUTs), wherein the computation is scalable because the ratio of the numbers of the upper bits and the lower bits can be adjusted. The method may skip unnecessary interpolation computation and choose the color patch directly so that the computation accuracy and speed are increased. Moreover, the secondary error caused by the distortion of interpolation computation can also be avoided. Preferably a fuzzy variable point interpolating method may be used to quickly quantize the color coordinate and determines the local attribute in color space for the data characteristic of an input image." One drawback of methods that are disclosed in this document is that the division of the LUT is made according to the bit depth, whatever the actual needs of transformation, i.e. the color content of the images to transform.

Other documents deals with the transmission of color palettes as U.S. Pat. No. 7,091,985.

SUMMARY

An object of the invention is to avoid the aforementioned drawbacks.

For this purpose, the subject of the invention is a method of transmission of at least one video sequence of images that is divided into a plurality of groups $G_1, G_2, \ldots, G_k, \ldots, G_V$ of successive images, comprising, for each group $G_k$ of successive images, the following steps:

transmitting source color values that represent image(s) of said group $G_k$ in a source color space, then applying a color transform adapted to transform transmitted source color values into destination color values that represent image(s) of said group $G_k$ into a destination color space, by using a resultant color transform look up table that is related to said group $G_k$, wherein, for said color transformation, before the transmission of the source color values of the images of said group $G_k$, a partial color transform look up table $\{(R_h, G_h, B_h, R'_h, G'_h, B'_h)\backslash h\in[1, \tilde{N}_{Gk}]\}$ related to said group $G_k$ is generated from a global color transform look up table representing said color transform, the size $\tilde{N}_{Gk}$ of said partial color transform look up table being smaller than the size $T^3$ of said global color transform look up table, then said generated partial color transform look up table of said group $G_k$ is transmitted, and, said resultant color transform look up table related to said group $G_k$ is reconstructed by combining the transmitted partial color transform look up table of this group $G_k$ with, if any, all the other partial color transform look up tables that have been previously transmitted and that are related to other groups of successive images.

Preferably, the generation of the different partial color transform look up tables is performed such that none of these different partial color transform look up tables overlaps with another one.

Source color values that represent an image may be only part of the whole color values of this image; the image transmission may be partial, scalable, in lower resolution, i.e. not all color values are to be transmitted.

The global color transform look up table is able to transform any source color value within the source color space into a destination color value within the destination color space.

The size of a color transform look up table corresponds to the numbers of pairs of input-output color values that are included within this color transform look up table.

Each of said look up tables comprise generally a plurality of pairs of color values, each pair comprising one source color value as an input and the corresponding destination color value as an output; as a variant where, for instance, source color values of a look up table are regularly sampled on a grid, each of said look up table comprise a plurality of pairs, each pair comprising the position of one source color value on said grid (and the reference of that grid, if necessary) as an input and, as previously, the corresponding destination color value as an output.

To transform source color values that are substantially different from all source color values (as an input) of the resultant color transform table that is used to transform them, interpolation is performed from the closest source color values (as an input) of this resultant color transform table; well known usual interpolation algorithms are used.

Generally, the resultant color transform look up tables are reconstructed not only by combining the transmitted partial color transform look up table, but also, for instance, by applying interpolation functions to generate missing input-output pairs of color values that are necessary to perform the color transform.

Preferably, the resultant color transform look up table are regularly sampled by using either color values of partial color transform look up tables or interpolated color values that are interpolated from theses color values of partial color transform look up tables.

Preferably, color values being digitized (using for instance D digits or bits), the transmission of color values is performed without truncation of their digits. When transmitting any partial color transform look up table, all digits of each color value of this table are then transmitted. Advantageously, source color values that are close to source color values that are part (as an input) of the resultant color transform table that is used to transform them are indeed very precisely transformed.

From group to group of images, the resultant color transform look up table incorporates more and more partial color transform look up tables, then being closer and closer to the global color transform table, as far as the transmission of the images of the video sequence is going on. For short video sequences, the transmission may end before the resultant color transform look up table is close enough to the global color transform table. For longer video sequences, as far as the resultant color transform look up table is considered as close enough to the global color transform table, no other partial color transform look up tables are generated and transmitted and no update of the resultant color transform look up table takes place, and the last group $G_V$ of images comprises all the remaining images to transmit.

According to the invention, the resultant color transform look up table that is used to calculate the destination color values is updated by reconstruction any time a partial color transform look up table is transmitted from the emitter towards the receiver. Images of the video sequence that are transmitted after a resultant color transform look up table is updated are transformed by using this updated resultant color transform look up table, until a next partial color transform look up table is transmitted. Images of the video sequence that are transmitted between two successive transmissions of color transform look up tables then form a group of images that are all transformed using the same resultant color transform look up table. Such a group may contain only one image. From group to group of images of the same video sequence, the resultant color transform look up table incorporates more and more partial color transform look up tables, then being closer and closer to the global color transform, then incorporating more and more input source color values of this global color transform. According notably to the duration of the video sequence and to the size of the global color transform look up table representing the color transform, the global color transform look up table is entirely transmitted or not entirely transmitted.

Thank to the invention, a good comprise is obtained between the precise methods of transmission of the prior art which requires the transmission of the entire global color transform look up table before starting to transmit the images to transform and the imprecise methods of transmission of the prior art in which only one partial color transform look up table or only truncated bits of the global color transform look up table are transmitted. According to the invention and contrary to what is disclosed in the document JP11/041,625, because there are a plurality of groups $G_k$ of successive images in the video sequence, i.e. at least two groups, the color transform is applied to the images of at least the second group by using a resultant color transform look up table that is reconstructed by combining at least two partial color transform look up tables, i.e. the partial color transform look up table related to the first group and the partial color transform look up table related to the second group.

Thank to the invention, the precision for the color transformation is increasing as far as the images are transmitted, without requiring large bandwidth for the transmission of the color transform look up tables.

At least one channel is used for transmission, which can be part of a wire or a wireless link; HDMI-compliant cable can be used for transmission, as any usual data-bus comprising several TMDS (Transition Minimized Differential Signaling) video data channels, a DDC (Display Data Channel) channel and an optional CEC (Consumer Electronics Control) channel. Preferably, the channel that is used for the transmission of the partial color transform look up tables is different from the channel that is used for the transmission of images, i.e. for the transmission of source color values related to these images. When using a HDMI-compliant cable, the DDC or the CEC channel is preferably used for the transmission of the partial color transform look up tables.

Generally, transmission is performed from an emitter towards a receiver. The emitter comprises an image emission control unit and a look up table emission control unit that are adapted to control the transmission of color values (representing the images or being part of the look up tables) towards the receiver. The receiver comprises an image reception control unit and a look up table reception control unit that are adapted to control the transmission of color values (representing the images or being part of the look up tables) from the receiver. Preferably, the receiver is connected to a color device, as a display device or a copy device.

On the emitter side, source color values of images are provided in a source color space. The source color space can be device dependant or device-independent. The source color space can be dependant on a virtual device, as, for example, the usual sRBG color space. Preferably, on the receiver side, destination color values are sent to the color device to which the receiver is connected, and the destination color space is dependant on this color device. According to a variant, source and/or destination color space can be device-independent, as for example the XYZCIE 1931 visual color space, or the LabCIE perceptually uniform visual color space.

Preferably, the generated partial color transform look up table of said group $G_k$ is transmitted though a color transform channel, and the number $\tilde{N}_{Gk}$ of input-output pairs within this partial color transform look up table of said group $G_k$, i.e. the size $\tilde{N}_{Gk}$ of this partial color transform look up table, is proportional to the bandwidth of said color transform channel.

Preferably, if said color values are transmitted through an image channel having an image bandwidth BWIM and if generated partial color transform look up table of said group $G_k$ is transmitted though a color transform channel having a color transform bandwidth $BWCT_{Gk}$, then the number $\tilde{N}_{Gk}$ of input-output pairs within said partial color transform look up table, i.e. the size $\tilde{N}_{Gk}$ of this partial color transform look up table, is inferior or equal to: $Q \times M_{G(k-1)}/(1+\log_2 T/D) \times BWCT_{Gk}/BWIM$, where Q is the number of pixels within each transmitted image, $M_{G(k-1)}$ is the number of images in the previous group $G_{k-1}$, if any, of transmitted image, and T is defined such that $T^3$ is the size of the global color transform look up table.

Then, the definition of the number $M_{G(k-1)}$ of images within each group $G_k$ and the definition of the number $\tilde{N}_{Gk}$ (or $\tilde{N}_G$) of input-output pairs within each partial color transform LUT is the basis for the definition of each group $G_k$, taking into account the available bandwidth. Generally, the number $M_{G(k-1)}$ of images within each group $G_{k-1}$ is constant and equal to $M_G$; then, for each group $G_k$, $\tilde{N}_{Gk} \leq Q \times M_G/(1+\log_2 T/D) \times BWCT_{Gk}/BWIM$.

Preferably, during the transmission of the images of a group $G_k$ through an image channel, partial color transform LUT of a following group $G_{(k+1)}$ is transmitted through a color transform channel, in order to prepare in advance the reconstruction of the resultant color transform look up table that is related to said following group $G_{(k+1)}$.

From one video sequence to another one, actual color transform may change for various reasons, that may depends on the video content, as far as, for instance, this sequence contains night scenes, indoor scenes and daylight outdoor scene having then substantially different colors and colors distribution. Preferably, to adapt the color transmission to the actual requirements of the images of a group which has to be transmitted, before the transmission of the source color values of the images of said group $G_k$:

$N_{Gk}$ more frequent source color values $\{(R_g, G_g, B_g) \backslash g \in [1, N_{Gk}]\}$ of said group $G_k$ are determined, then, to generate the partial color transform look up table $\{(R_h, G_h, B_h, R'_h, G'_h, B'_h) \backslash h \in [1, \tilde{N}_{Gk}]\}$ related to said group $G_k$, for each $(R_g, G_g, B_g)$ of these frequent source color values $\{(R_g, G_g, B_g) \backslash g \in [1, N_{Gk}]\}$, a source color value or input $(R_h, G_h, B_h)$ is extracted with its associated output $(R'_h, G'_h, B'_h)$ from the source color values or inputs of the global color transform look up table which are the closest to said source color value $(R_g, G_g, B_g)$ in the source color space.

When the same pair is extracted in connection with two different frequent source color values, then $\tilde{N}_{Gk}$ is inferior to $N_{Gk}$. The number $N_{Gk}$ of successive images into each group $G_k$ is then the basis for the definition of each group of images. As previously explained, this definition is preferably based also on bandwidth considerations.

Generally the distribution of source color values of the images of each group are statistically analyzed to determine the more frequent source color values of this group. While choosing the more frequent source colors, the measure of frequency may be weighted by a color importance term that is higher for important colors and lower for less important colors. Important colors can either be important colors in an artistic sense, or colors that can be displayed with higher precision on a display device or colors that are perceived by the human eye with a higher precision.

Preferably, the ($T^3$) input-output pairs of the global color transform look up table are distributed into N grids $L_1, \ldots, L_n, \ldots, L_N$ having increasing numbers $X_{L1} < \ldots < X_{Ln} < \ldots < X_{LN}$ of input-output pairs from a highest grid $L_1$ down to a lowest grid $L_N$ such that any source color value of the input-output pairs of a lower grid $L_n$ is located, in the source color space, between adjacent source color values of its next higher grid $L_{n-1}$; then, in order of decreasing frequency of the more frequent source color values $\{(R_g, G_g, B_g) \backslash g \in [1, N_{Gk}]\}$ of said group $G_k$, for each $(R_g, G_g, B_g)$ of these more frequent source color values, a source color value $(R_h, G_h, B_h)$ or input which has not yet been previously extracted is extracted with its associated output $(R'_h, G'_h, B'_h)$ from the highest grid $L_n$ of the global color transform look up table, starting from the highest grid $L_1$ down to the lowest grid $L_N$.

In a 3D color space, any source color value of a given grid is generally located at the center of a segment delimited by $2^1$ adjacent inputs or source color values of its next higher grid, or a the center of a square delimited by $2^2$ adjacent inputs or source color values of its next higher grid, or a the center of a cube delimited by $2^3$ adjacent inputs or source color values of its next higher grid. Instead of being located at the center of this segment, square, or cube, this source color value can be located elsewhere inside this segment, square, or cube, without departing from the invention. Preferably, in any given grid $L_n$, there is only on source color value inside any segment, square, or cube delimited by adjacent source color values of its next higher grid $L_{n-1}$.

As the generation of the partial color transform LUTs is done from upper coarser grids down to lower finer grids of the global color transform look up table, even colors values that are far away, in the source color space, from the most frequent color values, will be correctly transformed by the partial color transform LUT.

Preferably, instead of transmitting a source color value or input within each pair of the partial color transform look up table, only the position of the source color values within its grid is transmitted with the reference n of the grid; then each input-output pair contains this position with this reference n as the input and the corresponding destination color value as previously; one advantage of this variant is that the number of digits that are used to transmit each pair of the partial look up tables is lowered, then limiting the bandwidth requirements. Preferably, in each grid Ln, the inputs of the input-output pairs are regularly distributed in the source color space.

The subject of the invention is also a method of displaying at least one video sequence of images in a destination color space, wherein that video sequence of images is transmitted by using a method of transmission according the invention. The destination color space is associated with the color device that is used to display the images; such a color device can be an actual color device, as a LCD or plasma panel or a projector, or a virtual device as a standard for broadcasting video images, as, for instance, the so-called sRGB color space. The subject of the invention is also a system of transmission of at least one video sequence of images that it is able to implement a method of transmission according to the invention.

BRIEF DESCRIPTION OF THE DRAWINGS

The invention will be more clearly understood on reading the description which follows, given by way of non-limiting example and with reference to the appended figures in which.

DETAILED DESCRIPTION

Figure 1:
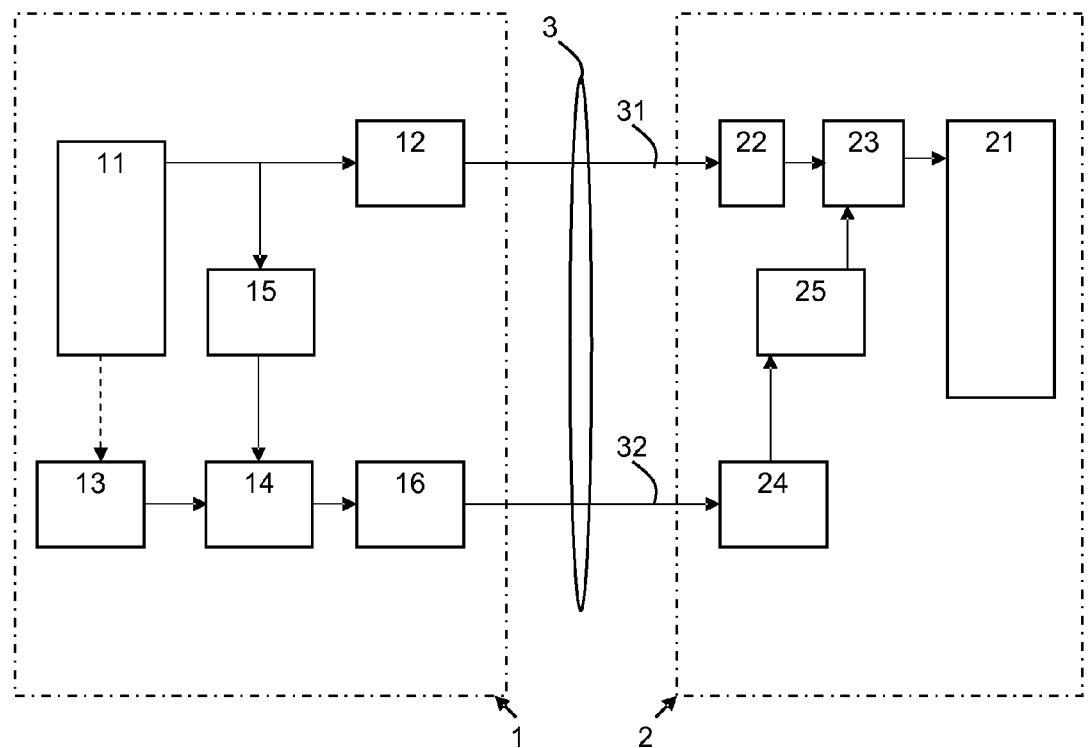
FIG. 1 is a schematic diagram of a system of transmission according to an embodiment of the invention.

In reference to FIG. 1, the transmission system according to an embodiment of the invention comprises an emitter 1, a receiver 2 and a transmission link 3 between the emitter 1 and the receiver 2.

The emitter 1 comprises an image emission control unit 12 and a color transform LUT emission control unit 16. The receiver 2 comprises an image reception control unit 22 and a color transform LUT reception control unit 24. The transmission link 3 comprises an image channel 31 that is adapted to transmit the image data that are sent by the image emission control unit 12 to the image reception control unit 22, and a color transform LUT channel 32 that is adapted to transmit the color transform LUT data that are sent by the color transform LUT emission control unit 16 to the color transform LUT reception control unit 24.

The emitter 1 comprises also an image data storing unit 11 that is adapted to deliver source color values of successive images of a video sequence to the image emission control unit 12. The emitter 1 comprises also a color transform data storing unit 13, a partial color transform LUT generating unit 14, and a histogram generating unit 15. The color transform data storing unit 13 is adapted to deliver a global color transform LUT that is related to a video sequence that the image data storing unit 11 is going to deliver to the image emission control unit 12. The histogram generating unit 15 is adapted to generate histograms of source color values of successive images that are delivered to the image emission control unit 12. The partial color transform LUT generating unit 14 is adapted to generate, from the global color transform LUT delivered by the color transform data storing unit 13, a partial color transform LUT that is related to the most frequent source color values that have been identified on the histogram of source color values that is provided by the histogram generating unit 15, and to deliver this partial color transform LUT to the color transform LUT emission control unit 16.

The receiver 2 comprises also a color device 21. A destination color space is attached to this color device, the characteristics of which are stored in the color transform data storing unit 13, in order to enable it to deliver a global color transform LUT that is adapted to transform the source color values of images of the video sequence into destination color values. The receiver 2 comprises also a color transform unit 23 that is adapted to transform the source color values that have been received by the image reception unit 22 into destination color values and to deliver them to the color device 21, in order to display or to copy the corresponding images of the video sequence. The global color transform LUT is adapted in a manner known per se to obtain a good reproduction of the images with this color device 21, and may include gamut mapping algorithm if necessary. The receiver 2 comprises also a resultant color transform LUT generating unit 25 that is adapted to reconstruct a resultant color transform LUT from the successive partial color transform LUT that are delivered by the color transform LUT reception unit 24, and to deliver the resultant color transform LUT to the color transform unit 23 to allow it to transform the source color values.

The color device 21 can be for instance a display device or a copy device. More generally, color device also include varying media such as paper for color prints, film for film projection or digital media (for example DVD) for monitor display. In this sense, a color device may include several physical devices such as a DVD recorder and a connected monitor.

A transmission method according to an embodiment of the invention will now be described. Prior to the application of the transmission method:

source color values of successive images $Im_1$ to $Im_V$ of the video sequence $S_V$ are stored as digitized numbers in the image data storing unit 11; any source color value of any pixel $Pix_i$ of a given image $Im_q$ of this sequence $S_V$ is a triplet $R_{iq}$, $G_{iq}$, $B_{iq}$ of numerical values that are coded with a bit depth D=10 and that are then comprised between 0 and 1023 (0 and 1023 included). Each image comprises Q pixels $Pix_i$, then $0 \leq i < Q$.

color transform data are stored in the color transform data storing unit 13, that are able to transform source color values of the video sequence $S_V$ that are expressed in a source color space into destination color values of the same video sequence $S_V$ that are expressed in the destination color space that is related to the color device 21. Such color transform data globally represent a given color transform $f(\cdot)$ that allows to calculate a global color transform LUT where output destination color values $R'_j$, $G'_j$, $B'_j$ are calculated from input source color values $R_j$, $G_j$, $B_j$ as follows: $(R'_j, G'_j, B'_j) = f(R_j, G_j, B_j)$. The global color transform LUT is then represented as $\{(R_j, G_j, B_j, R'_j, G'_j, B'_j) \backslash j \in [0, T^3-1]\}$, with T being the resolution of this global color transform LUT, e.g. $T=257=2^8+1$, resulting in a number of $T^3$ LUT values. Here, the LUT source color entries are chosen on a regular RGB grid as follows:

$$(R_j, G_j, B_j) = \left(\frac{p(2^D-1)}{T-1}, \frac{q(2^D-1)}{T-1}, \frac{j(2^D-1)}{T-1}\right),$$

with
$p=j \mod T^2$; $q=j \mod T$; $0 \leq j < T^3$, where <<mod>> is the abbreviation of <<modulo>>, and where D, already defined, is the number of bits of image signals, i.e. of LUT inputs and outputs.

Such a color transform as defined above with its global color transform LUT may include gamut mapping algorithms that are adapted for the specific transformation from the source color space towards the destination color space or color transformations based on gamut boundary descriptors of the source color gamut and of the destination color gamut in a common color space. While the invention relates to any type of color transform, the preferred embodiment is a solution for a colour transform from a device-dependant RGB (red, green, blue) color space into another device-dependant R'G'B' color space. Other color spaces such as YCbCr or device-independent color space as CIE XYZ or CIE L*a*b* can be used. Moreover, color space coordinates as RGB, YCbCr, CIE XYZ or CIE L*a*b* may be encoded according to standards such as IEC 61966-2-4 or SMPTE S274M. Furthermore, the preferred embodiment is a solution for so-called 3D Look-Up Table (LUT). Other color transforms such as several one-dimensional LUTs, linear matrices, or any mathematical transforms can be used instead of the global color transform LUT. As a variant, instead of being calculated as described above, color transform may be defined directly as a global color transform LUT and stored directly as is in the color transform data storing unit 13.

The transmission method according to the embodiment of the invention then comprises the following steps:

1) The image data storing unit 11 then provides the image emission control unit 12 and the histogram generating unit 15 with a first group $G_1$ of successive images of the video sequence $S_V$, by delivering to these units the corresponding source color values.

2) the histogram generating unit 15 analyses statistically the source color values that are provided by the image date storing unit 11 and output the $N_{G1}$ most frequent source color values $\{(R_g, G_g, B_g) \backslash g \in [1, N_{G1}]\}$ of the images of the first group $G_1$.

3) for each $(R_g, G_g, B_g)$ of these most frequent source color values $\{(R_g, G_g, B_g) \backslash g \in [1, N_{G1}]\}$, the partial color transform LUT generating unit 14 extracts, from the $T^3$ source color values or inputs of the global color transform LUT, a source color value or input $(R_h, G_h, B_h)$ which is the closest to said source color value $(R_g, G_g, B_g)$ in the source color space, and combine this extracted input $(R_h, G_h, B_h)$ with its associated output $(R'_h, G'_h, B'_h)$ to form a pair $(R_h, G_h, B_h, R'_h, G'_h, B'_h)$ of input-output; all extracted pairs then generate a partial color transform look up table $\{(R_h, G_h, B_h, R'_h, G'_h, B'_h) \backslash h \in [1, \tilde{N}_{G1}]\}$ that is related to the group $G_1$ and that is then delivered to the color transform LUT emission control unit 16. The number $\tilde{N}_{G1} \leq N_{G1}$ of colors is smaller than the number $T^3$ of LUT entries and is chosen with respect to the available transmission bandwidth as explained forward.

4) the color transform LUT emission control unit 16 then transmits the input values and all digits of the output values of this partial color transform LUT (when the input values lie on a grid, in practice full RGB values will not be transmitted but grid coordinates): $\{(R_h, G_h, B_h, R'_h, G'_h, B'_h) \backslash h \in [1, \tilde{N}_{G1}]\}$ to the color transform LUT reception control unit 24 through the color transform channel 32 of the transmission link 3.

5) the resultant color transform LUT generating unit 25 which is provided with the partial color transform LUT: $\{(R_h, G_h, B_h, R'_h, G'_h, B'_h) \backslash h \in [1, \tilde{N}_{G1}]\}$, stores this partial color transform LUT as the resultant color transform LUT of the $1^{st}$ group $G_1$ of successive images, applying preferably but optionally an interpolation function to generate the missing colors in the resultant color transform LUT, and delivers this resultant color transform LUT to the color transform unit 23.

6) the image emission control unit 12 then transmits the source color values of the successive images of the first group $G_1$ to the image reception control unit 22 through the image channel 31 of the transmission link 3.

7) then, the color transform unit 23 applies the resultant color transform LUT to the source color values of the images of the first group $G_1$, in order to transform in a manner known per se all these source color values into destination color values.

8) the color device 21, when being for instance a display device, can then display the successive images of the first group $G_1$ of the video sequence $V_S$ by using the destination color values that are provided by the color transform unit 23.

9) The image data storing unit 11 then provides again the image emission control unit 12 and the histogram generating unit 15 with a second group $G_2$ of successive images of the video sequence $S_V$, by delivering to these units the corresponding source color values.

10) the histogram generating unit 15 analyses statistically these source color values and, after having excluded the $N_{G1}$ most frequent source color values $\{(R_g, G_g, B_g) \backslash g \in [1, \tilde{N}_{G2}]\}$ of the previous group $G_1$, output the other $N_{G2}$ most frequent source color values $\{(R_g, G_g, B_g)\backslash g\epsilon[1, \tilde{N}_{G2}]\}$ of the second group $G_2$ with $\tilde{N}_{G2} \leq N_{G2}$ and $\tilde{N}_{G2} \leq T^3 - \tilde{N}_{G1}$.

11) for each $(R_g, G_g, B_g)$ of these most frequent source color values $\{(R_g, G_g, B_g)\backslash g\epsilon[1, \tilde{N}_{G2}]\}$ of the second group $G_2$, the partial color transform LUT generating unit 14 extracts, from the $T^3$ source color values or inputs of the global color transform look up table, a source color value or input $(R_h, G_h, B_h)$ which is the closest to said source color value $(R_g, G_g, B_g)$ in the source color space and which has not yet been extracted for the generation of the previous partial color transform look up table at the step 3) above, and combine this extracted input $(R_h, G_h, B_h)$ with its associated output $(R'_h, G'_h, B'_h)$ to form a pair $(R_h, G_h, B_h, R'_h, G'_h, B'_h)$ of input-output; all extracted pairs then generate a partial color transform look up table $\{(R_h, G_h, B_h, R'_h, G'_h, B'_h)\backslash h\epsilon[1, \tilde{N}_{G2}]\}$ that is related to the group $G_2$ and that is then delivered to the color transform LUT emission control unit 16. The number $\tilde{N}_{G2} \leq N_{G2}$ of colors is smaller than the number $T^3 - \tilde{N}_{G1}$ of remaining LUT entries and is chosen with respect to the available transmission bandwidth as explained forward.

12) preferably during the above step 6 of transmission of the source color values of the successive images of the previous group $G_1$, the color transform LUT emission control unit 16 transmits all digits of at least the output values this partial color transform LUT $\{(R_h, G_h, B_h, R'_h, G'_h, B'_h)\backslash h\epsilon[1, \tilde{N}_{G2}]\}$ to the color transform LUT reception control unit 24 through the color transform channel 32 of the transmission link 3.

13) the resultant color transform LUT generating unit 25 then combines this partial color transform LUT $\{(R_h, G_h, B_h, R'_h, G'_h, B'_h)\backslash h\epsilon[1, \tilde{N}_{G2}]\}$ with the partial color transform LUT $\{(R_h, G_h, B_h, R'_h, G'_h, B'_h)\backslash h\epsilon[1, \tilde{N}_{G1}]\}$ of the previous group, to reconstruct a new resultant color transform LUT for this second group $G_2$, applying preferably but optionally an interpolation function to generate the missing colors in the resultant color transform LUT, and delivers this new resultant color transform LUT to the color transform unit 23.

14) the image emission control unit 12 then transmits the source color values of the successive images of the second group $G_2$ to the image reception control unit 22 through the image channel 31 of the transmission link 3.

15) then, the color transform unit 23 applies the new resultant color transform LUT to the source color values of the second group $G_2$, transforming all these source color values into destination color values.

16) the color device 21, when being or instance a display device, can then display the successive images of the second group $G_2$ of the video sequence $V_S$ by using the destination color values that are provided by the color transform unit 23.

The above 1) to 8), then 9) to 16) steps are repeated for each of the following groups $G_3, \ldots, G_k, \ldots G_V$ of successive images of the video sequence $S_V$:

the histogram generating unit 15 analyses statistically the source color values of the images of a group $G_k$, and, after having excluded the most frequent source color values of the previous groups $G_1$ to $G_{k-1}$, output the other $N_{Gk}$ most frequent source color values $\{(R_g, G_g, B_g)\backslash g\epsilon[1, N_{Gk}]\}$ of the group $G_k$.

the resultant color transform LUT generating unit 25 then combines the partial color transform LUT $\{(R_g, G_g, B_g, R'_g, G'_g, B'_g)\backslash g\epsilon[1, \tilde{N}_{Gk}]\}$ that has been again generated as in steps 3) and 11) above by the partial color transform generating unit 14 with all the partial color transform LUT of the previous groups $G_1$ to $G_{k-1}$, to reconstruct a new resultant color transform LUT for this group $G_k$, applying preferably but optionally an interpolation function to generate the missing colors, if any, in the resultant color transform LUT, and delivers this new resultant color transform LUT to the color transform unit 23.

then, the color transform unit 23 applies the new resultant color transform LUT to the source color values of the group $G_k$, transforming all these source color values into destination color values.

As, for each group $G_k$ of successive images of the video sequence $S_V$, the histogram generating unit 15 excludes the most frequent source color values of the previous groups $G_1$ to $G_{k-1}$ (see for instance step 10 above), and as for each $(R_g, G_g, B_g)$ of these most frequent source color values $\{(R_g, G_g, B_g)\backslash g\epsilon[1, N_{Gk}]\}$ of this group $G_k$, the partial color transform LUT generating unit 14 extracts only source color values or inputs $(R_h, G_h, B_h)$ which have not yet been extracted for the generation of the previous partial color transform look up table (see for instance step 11 above), the generation of the different partial color transform look up tables is performed such that none of these different partial color transform look up tables overlaps with another one. If the histogram generating unit 15, after having analysed statistically the source color values of the images of one group $G_q$ and after having excluded the most frequent source color values of the previous groups $G_1$ to $G_{q-1}$, output zero most frequent source color values ($N_{Gq}=0$), because, for instance, the source color values of the images of this group $G_q$ are all identical or similar with the source color values of the images of another previous group of the video sequence, then the partial color transform LUT generating unit 14 would for instance extract, from the $T^3$ source color values or inputs of the global color transform look up table, an arbitrary selection of source color values or inputs $(R_h, G_h, B_h)$ which have not yet been extracted for the generation of the previous partial color transform look up tables. The size $\tilde{N}_{Gq}$ of this "arbitrary generated" partial color transform LUT would also be inferior to $T_3$ as for the other partial color transform LUTs.

As soon as the total number $\tilde{N}_{G1} + \tilde{N}_{G2} + \ldots + \tilde{N}_{GV}$ of input-output pairs of the different partial color transform look up tables, including a last partial color transform look up table under generation associated with a group $G_V$, reaches the total number $T^3$ of input-output pairs of the global color transform look up table, this last group $G_V$ will gather all the remaining images of the video sequence to transmit. After transmission of this last partial look up table, the resultant color transform LUT of this last group corresponds to the entire global color transform LUT which is then entirely and progressively transmitted. All images of the last group $G_V$ are then color transformed using the maximum of precision, because the entire global color transform LUT can now be used for this transformation.

On the opposite, if the total number $\tilde{N}_{G1} + \tilde{N}_{G2} + \ldots + \tilde{N}_{GV}$ of input-output pairs of the different partial color transform look up tables, including a last partial color transform look up table under generation associated with a group $G_V$, does not reach the total number $T^3$ of input-output pairs of the global color transform look up table before the transmission of the entire video sequence, then the transmission of images of the sequence $S_V$ will stop before the transmission of the whole global color transform LUT and the images of the last group $G_V$ will be transformed by using a resultant color transform LUT which is still only a part of the entire global color transform LUT. For this sequence, the global color transform LUT is then not entirely transmitted.

According to a variant, the transmission of the may also be stopped or paused at $\tilde{N}_{G1} + \tilde{N}_{G2} + \ldots + \tilde{N}_{Gk} < T^3$ according to a color distance criterion based on the distance of source color values and corresponding chosen closest source input color values of partial LUTs. As soon as the distance criterion is smaller than a predefined threshold, not partial LUT is transmitted.

Preferably, during the transmission of the $\tilde{N}_{Gk}$ pairs of the partial color transform LUT of a group $G_k$ by using the color transform channel 32, the $M_{G(k-1)}$ successive images $Im_1$, $Im_2$, $Im_q$, ..., $Im_{mG(k-1)}$ of the previous group $G_{(k-1)}$ are transmitted through the image channel 31.

Let us assume that the available bandwidth of the image channel 31 is constant and equal to BWIM (generally expressed in Mbit/s); if the available bandwidth of the color transform channel 32 for the transmission of the partial color transform LUT of a group $G_k$ is $BWCT_{Gk}$ (expressed in the same units, generally in Mbit/s), then:

the time that is necessary to transmit this partial color transform LUT of the group $G_k$ will be at least equal to $(3 \times \log_2 T + 3 \times D) \times \tilde{N}_{Gk}/BWCT_{Gk}$, if only the T positions of the input values on the 3 axis of a grid are transmitted instead of the corresponding actual source color values;

the time that is necessary to transmit the $M_G$ images of the group $G_{k-1}$ will be equal to $3 \times D \times M_{G(k-1)} \times Q/BWIM$ expected, where Q, already defined, is the number of pixels within each image.

It is expected that the time that is necessary to transmit this partial color transform LUT of the group $G_k$ will be lower than the time that is necessary to transmit the $M_G$ images of the group $G_{k-1}$, i.e.:

$$(3 \times \log_2 T + 3 \times D) \times \tilde{N}_{Gk}/BWCT_{Gk} \leq 3 \times D \times M_{G(k-1)} \times Q/BWIM, \text{ or:}$$

$$(1 + \log_2 T/D) \times \tilde{N}_{Gk} \times BWIM \leq Q \times M_{G(k-1)} \times BWCT_{Gk}, \text{ or:}$$

$$\tilde{N}_{Gk} \leq Q \times M_{G(k-1)}/(1 + \log_2 T/D) \times BWCT_{Gk}/BWIM.$$

Preferably, to optimize the available bandwidth, the size $\tilde{N}_{Gk}$ of the partial color transform LUT is adapted according to the equation: $\tilde{N}_{Gk} = Q \times M_{G(k-1)}/(1 + \log_2 T/D) \times BWCT_{Gk}/BWIM$.

Generally, the available bandwidth for the partial color transform LUT is constant and equal to BWCT. Preferably, except for the last group $G_V$, all groups $G_1$, $G_2$, ..., $G_k$, ..., $G_{V-1}$ comprise the same number of images $M_G$.

The definition of the number $M_{Gk}$ (or $M_G$) of images within each group $G_k$ and the definition of the number $\tilde{N}_{Gk}$ (or $\tilde{N}_G$) of inputs within each partial color transform LUT is considered as a definition of each group $G_k$.

Thank to the invention, a good comprise is obtained between the precise methods of transmission of the prior art which requires the transmission of the entire global color transform look up table before starting to transmit the images to transform and the imprecise methods of transmission of the prior art in which only one partial color transform look up table or only truncated bits of the global color transform look up table are transmitted; thank to the invention, the precision for the color transformation is increasing as far as the images are transmitted, without requiring large bandwidth for the transmission of the color transform look up tables.

According to a variant of the steps 2) and 10) of formation of a partial color transform LUT of the method according to the invention, the $T^3$ input-output pairs of the global color transform look up table are distributed into N layers or grids $L_1$, ..., $L_n$, ..., $L_N$ having increasing numbers $X_{L1} < ... < X_{Ln} < ... < X_{LN}$ of input-output pairs from a highest layer $L_1$ down to a lowest layer $L_N$. Each lower layer $L_n$ is finer that its next upper layer $L_{n-1}$, i.e. the definition of the layers or grids is higher and higher when the layers are lower and lower. Each lower grid $L_n$ is intercalated into its next upper grid $L_{n-1}$ such as any source color value of the input-output pairs of this lower layer $L_n$ is located, in the source color space, between adjacent source color values of the input-output pairs of its next higher layer $L_{n-1}$. In a 3D color space, adjacent source color values of a layer $L_{n-1}$ may be a group of $2^1$ closest source color values as two black dots along any of the main axis of the color space on FIG. 2, between which a white dot of a finer layer $L_n$ is located as shown on FIG. 2; in such a 3D color space, adjacent source color values of a layer $L_{n-1}$ may be also a group of $2^2$ closest source color values as four black dots in any plane parallel to a main axis of the color space on FIG. 2, between which a white dot of a finer layer $L_n$ is located as shown on FIG. 2, i.e. at the center of a square delimited by these four black dots; in such a 3D color space, adjacent source color values of a layer $L_{n-1}$ may be at last a group of $2^3$ closest source color values as eight black dots forming a cube in the color space on FIG. 2, between which a white dot of a finer layer $L_n$ is located as shown on FIG. 2, i.e. at the center of this cube.

According to this variant, the partial color transform LUT $\{(R_h, G_h, B_h, R'_h, G'_h, B'_h)\backslash h \in [1, \tilde{N}_{G1}], \tilde{N}_{G1} = N_{G1}\}$ which is related to any given group $G_k$ of images is extracted as follows from this different layers or grids of the global color transform look up table:

in order of decreasing frequency, for each $(R_g, G_g, B_g)$ of the most frequent source color values $\{(R_g, G_g, B_g)\backslash g \in [1, N_{Gk}]\}$ of the images of the group $G_k$, the source color value or input $(R_h, G_h, B_h)$ of the highest layer $L_n$ of the global color transform LUT which is the closest to this most frequent source color values $(R_g, G_g, B_g)$ is extracted with its associated output $(R'_h, G'_h, B'_h)$, as far as this source color value or input has not yet been extracted in association with another source color value, for this group $G_k$ or a previous more frequent one;

if the source color value or input of the highest layer $L_n$ which is the closest to this most frequent source color values has already been extracted with its associated output in association with another source color value, another closest pair $(R_h, G_h, B_h; R'_h, G'_h, B'_h)$ of the global color transform LUT is extracted from the same layer $L_n$ or from a lower layer $L_{n+n'}$, where $n' \geq 1$.

Consequently, as for each $(R_g, G_g, B_g)$ of the most frequent source color values of the images of the group $G_k$ a pair $(R_h, G_h, B_h; R'_h, G'_h, B'_h)$ of the global color transform LUT is extracted, a partial color transform LUT $\{(R_h, G_h, B_h, R'_h, G'_h, B'_h)\backslash h \in [1, \tilde{N}_{Gk}], \tilde{N}_{Gk} = N_{Gk}\}$ is then generated.

Preferably, within each layer or grid $L_n$, the source color value or input $(R_h, G_h, B_h)$ are regularly sampled in the source color space.

An advantage of such a variant is that, as the generation of the partial color transform LUTs is done from upper coarser grids down to lower finer grids of the global color transform look up table, even colors values that are far away, in the source color space, from the most frequent color values, will be correctly transformed by the partial color transform LUT.

For this advantageous variant, any other association of the most frequent source color values $\{(R_g, G_g, B_g)\backslash g \in [1, N_{G1}]\}$ of the group $G_k$ of images with pairs $(R_h, G_h, B_h; R'_h, G'_h, B'_h)$ of the global color transform LUT that is able to form a partial color transform LUT $\{(R_h, G_h, B_h, R'_h, G'_h, B'_h)\backslash h \in [1, \tilde{N}_{Gk}], \tilde{N}_{Gk} = N_{Gk}\}$ from different grids or layers ofl the global color transform look up table can be used without departing from the invention. The number $\tilde{N}_{Gk}$ of pairs in this partial color transform LUT can be inferior to the number of most frequent source color values $N_{Gk}$ of the group $G_k$, for instance when, if the source color value or input of the highest layer $L_n$ which is the closest to this most frequent source color values has already been extracted with its associated output in association with another source color value, no other closest pair ($R_h$, $G_h$, $B_h$; $R'_h$, $G'_h$, $B'_h$) of the global color transform LUT is extracted from the global color transform LUT.

Figure 2:
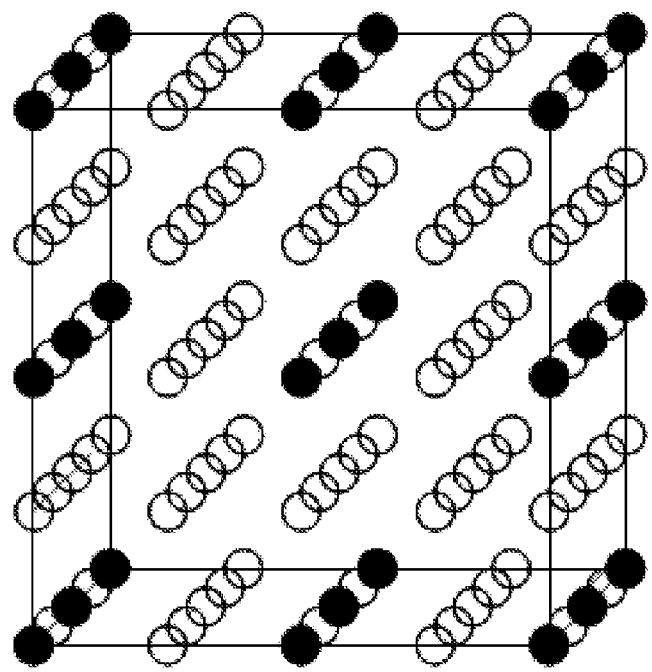
FIG. 2 shows, in the source color space, a distribution of the inputs of the input-output pairs of the global color transform LUT according to a variant of an embodiment of the transmission method according to the invention.

In reference to FIG. 2, a more detailed example is now given of this advantageous variant.

The $T^3$ input-output pairs of color values of the global color transform LUT are distributed into N layers, when N is calculated according to the equation $T-1=2^N$; if $T=5$, we have $N=2$ layers (see FIG. 2); the highest layer $n=1$ (black dots on FIG. 2) contains $(2^n+1)^3=27$ LUT output values, as the lowest layer $n=2$ (white dots on FIG. 2) contains $(2^n+1)^3-(2^{n-1}+1)^3=125-27=98$ LUT output values. In the general case of N layers, each layer n contains $$D_n = (2^n+1)^3 - \sum_{i=1}^{n-1}(2^i+1)^3$$

color values. The first, highest layer $n=1$ requires $3.D.D_1 = (2^1+1)^3 = 81.D$ bits for the transmission of the output values of the LUT while the last, lowest layer $n=N=\log_2(T-1)$ requires $$D_N = 3 \cdot D \cdot D_N = 3 \cdot D \cdot T^3 - \sum_{i=1}^{\log_2(T-1)-1}(2^i+1)^3 \text{ bits.}$$

According to the example of this variant of the steps 2) and 10) of formation of a partial color transform LUT, the partial color transform LUT generating unit 14 chooses, from the N layers of the global color transform LUT that is stored in the color transform data storing unit 13, for each of ($R_g$, $G_g$, $B_g$) most frequent source color values, in order of decreasing frequency, the closest pair ($R_h$, $G_h$, $B_h$, $R'_h$, $G'_h$, $B'_h$) of the global color transform LUT, searching for this closest color in the N layers starting from the highest layer, in order of decreasing layer, while searching already chosen entry colors are ignored, and ending with obtaining for each of those closest colors $\{(R_h, G_h, B_h)\backslash h\in[1, \tilde{N}_{Gk}], \tilde{N}_{Gk} \leqq N_{Gk}\}$ the ($R'_h$, $G'_h$, $B'_h$) destination color values are from the global color transform LUT, then forming a partial color transform LUT: $\{(R_h, G_h, B_h, R'_h, G'_h, B'_h)\backslash h\in[1, \tilde{N}_{Gk}]\}$ that is sent to the color transform LUT emission control unit 16. The number $\tilde{N}_{Gk}$ of colors is chosen with respect to the available transmission bandwidth as already explained.

Preferably, instead of transmitting a source color value or input within each pair of the partial color transform look up table, only the position of the source color values within its grid is transmitted; then each input-output pair contains this position as the input and the corresponding destination color value as previously; this variant can be advantageously used as soon as the source color values are regularly distributed within the source color space; one advantage of this variant is that the number of digits that are used to transmit each pair of the partial look up tables is lowered, then limiting the bandwidth requirements.

It will be understood that the present invention has been described purely by way of example, and modifications of detail can be made without departing from the scope of the invention. For example, it is possible to combine the method according to the invention with a method using the truncation of digits according to the prior art.

Each feature disclosed in the description and (where appropriate) the claims and drawings may be provided independently or in any appropriate combination. Features may, where appropriate be implemented in hardware, software, or a combination of the two. Transmission link may, where applicable, be implemented as wireless transmission or wired, not necessarily direct or dedicated, transmissions.

Reference numerals appearing in the claims are by way of illustration only and shall have no limiting effect on the scope of the claims.

The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination.

The invention claimed is:

1. Method of transmission of at least one video sequence of images that is divided into a plurality of groups $G_1, G_2, \ldots, G_k, \ldots, G_V$ of successive images, comprising, for each group $G_k$ of successive images, the following steps:
transmitting, from an emitter, source color values that represent image(s) of said group $G_k$ in a source color space,
applying a color transform adapted to transform transmitted source color values into destination color values that represent image(s) of said group $G_k$ into a destination color space, by using a resultant color transform look up table that is related to said group $G_k$,
wherein, for said color transformation:
before the transmission of the source color values of the images of said each group $G_k$,
generating a partial color transform look up table $\{(R_h, G_h, B_h, R'_h, G'_h, B'_h)\backslash h\in[1, \tilde{N}_{Gk}]\}$ related to said group $G_k$ from a global color transform look up table representing said color transform, the size $\tilde{N}_{Gk}$ of said partial color transform look up table being smaller than the size ($T^3$) of said global color transform look up table,
transmitting said generated partial color transform look up table of said group $G_k$, and
reconstructing said resultant color transform look up table related to said group $G_k$ by combining the transmitted partial color transform look up table of said group $G_k$ with all the other partial color transform look up tables that have been previously transmitted and that are related to other groups of successive images,
wherein the generation of the different partial color transform look up tables is performed such that none of these different partial color transform look up tables overlaps with another one;
wherein, if said source color values are transmitted through an image channel having an image bandwidth BWIM and if a generated partial color transform look up table of said group $G_k$ is transmitted through a color transform channel having a color transform bandwidth $BWCT_{Gk}$, then the size $\tilde{N}_{Gk}$ of this partial color transform look up table is inferior or equal to: $Q \times M_{G(k-1)}/(1+\log_2 T/D) \times BWCT_{Gk}/BWIM$, where Q is the number of pixels within each transmitted image, $M_{G(k-1)}$ is the number of images in the previous group $G_{k-1}$ of transmitted images, and D is the number of bits for a given color value.

2. Method of transmission according to claim 1 wherein said generated partial color transform look up table of said group $G_k$ is transmitted through a color transform channel, and in that the size $\tilde{N}_{Gk}$ of this partial color transform look up table is proportional to the bandwidth of said color transform channel.

3. Method of transmission according to claim 1, wherein, during the transmission of the source color values of images of a group $G_k$ through the image channel, a partial color transform LUT of a following group $G_{(k+1)}$ is transmitted through a color transform channel.

4. Method of transmission according to claim 1, wherein, before the transmission of the source color values of the images of said group $G_k$:

$N_{Gk}$ more frequent source color values $\{(R_g,G_g,B_g)\backslash g\in[1,N_{Gk}]\}$ of said group $G_k$ are determined, then, to generate the partial color transform look up table $\{(R_h,G_h,B_h,R'_h,G'_h,B'_h)\backslash h\in[1,\tilde{N}_{Gk}]\}$ related to said group $G_k$, for each $(R_g, G_g, B_g)$ of these frequent source color values $\{(R_g,G_g,B_g)\backslash g\in[1,N_{Gk}]\}$, a source color value or input $(R_h, G_h, B_h)$ is extracted with its associated output $(R'_h, G'_h, B'_h)$ from the source color values or inputs of the global color transform look up table which are the closest to said source color value $(R_g, G_g, B_g)$ in the source color space.

5. Method of transmission according to claim 4, wherein, input-output pairs of the global color transform look up table are distributed into N grids $L_1, \ldots, L_n, \ldots, L_N$ having increasing numbers $X_{L1}<\ldots<X_{Ln}<\ldots<X_{LN}$ of input-output pairs from a highest grid $L_1$ down to a lowest grid $L_N$ such that any source color value of the input-output pairs of a lower grid $L_n$ is located, in the source color space, between adjacent source color values of its next higher grid $L_{n-1}$:

in order of decreasing frequency of the more frequent source color values $\{(R_g,G_g,B_g)\backslash g\in[1,N_{Gk}]\}$ of said group $G_k$, for each $(R_g, G_g, B_g)$ of these more frequent source color values, a source color value $(R_h, G_h, B_h)$ or input which has not yet been previously extracted is extracted with its associated output $(R'_h, G'_h, B'_h)$ from the highest grid $L_n$ of the global color transform look up table, starting from the highest grid $L_1$ down to the lowest grid $L_N$.

6. Method of transmission according to claim 5 wherein, in each grid Ln, the inputs of the input-output pairs are regularly distributed in the source color space.

7. Method of displaying at least one video sequence of images in a destination color space, wherein video sequence of images is transmitted by using a method of transmission according to claim 1.

8. System of transmission of at least one video sequence of images wherein it is able to implement a method of transmission according to claim 1.

* * * * *